3,149,327
MICROWAVE SUPERREGENERATIVE PULSE RADAR
Robert W. Bogle, Silver Spring, Md., assignor to the United States of America as represented by the Secretary of the Navy
Filed June 26, 1957, Ser. No. 668,268
1 Claim. (Cl. 343—13)

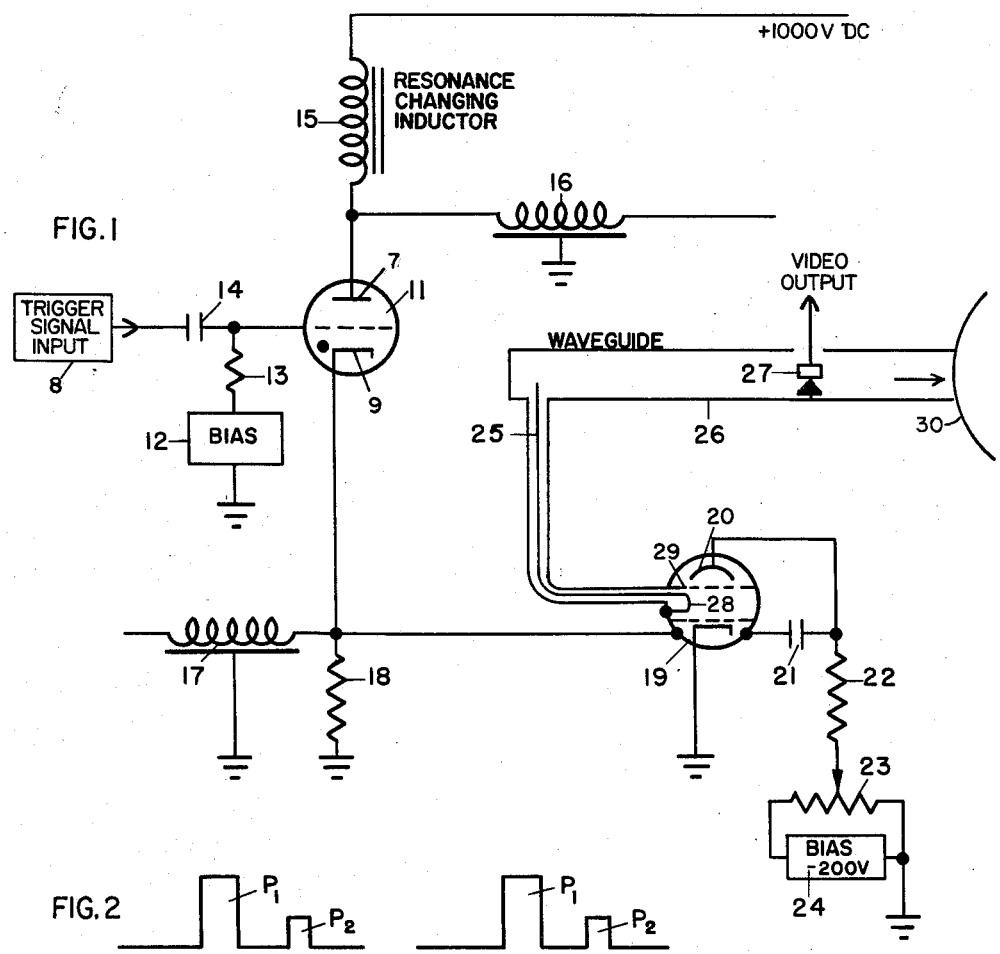

This invention relates to a microwave superregenerative pulse radar system and more particularly to a pulse radar system wherein superregenerative radar principles are applied to klystron microwave oscillators operating in the region of 10,000 megacycles.

The conventional pulse radar systems include a transmitter which produces short bursts or pulses of radio frequency signal, which after radiation from a suitable antenna may be reflected by a target of some kind. A fraction of the original RF signal is returned to a receiver by way of the same or possibly another antenna after an elapsed time which by the nature of the constant velocity of electromagnetic propagation is exactly proportional to the distance from the radar to the target.

The best known pulse radar systems utilize separate transmitter and receiver sections, the latter usually consisting of a superheterodyne circuit wherein most of the amplification takes place in IF and video stages, whose intelligence bandwidth and inversely gain is determined by the degree of range resolution required. Total gain bandwidth and also the match of the receiver local oscillator and transmitter frequencies are typical problems involved in this type of radar.

A superregenerative pulse radar system is disclosed in a copending application of R. W. Bogle and W. S. Knowles, Serial No. 668,269, filed June 26, 1957, now Patent No. 3,088,112, which is based upon the compatability of pulsing an RF oscillator radar-wise for range resolution and pulsing an oscillator for the purpose of establishing a condition of superregenerative sensitivity. Superregeneration is based on the characteristic of an RF oscillator periodically turned on from a quiescent or non-oscillating condition, that the rate of growth of oscillations is so affected by the presence of an RF signal of appropriate frequency that output signals representing great effective amplification may be extracted from the oscillator circuit. The mechanistic basis for the amplification is that large changes in the amplitude and duration of the RF pulse envelope are brought about by the influence of very small signals at the critical instant when the oscillation process is first starting to build up. In the superregenerative pulse radar system two pulses are periodically applied to the oscillator at a definite repetition interval with the second pulse being applied at a definite time after the first pulse and being of a lower or smaller amplitude.

In this prior system the first pulse serves as a transmitter output and the second pulse for its receiver action. In a radar system it will be apparent that an echo of the first pulse returned from a target at the proper distance will appear at a time delayed just sufficiently so as to influence the detector pulse, just as though it came from an entirely separate source. This prior system has the basic advantage that all of the essential amplification takes place in the RF part of the system. Thus the amplifier consisting of the RF oscillator has a wide effective bandwidth and can therefore handle pulse information of very short duration. This capability makes for high resolution in range determination which is a desirable characteristic.

Since the oscillator utilized in this prior superregenerative radar system is a conventional triode operating in the 1,000 megacycle region, this system is limited in its minimum range and pulse resolution.

The microwave system of the present invention consists essentially of a reflex klystron oscillator operating in the microwave region and feeding into a waveguide which is operatively associated with the transmitting and receiving antenna and a diode in the waveguide from which the video output consisting of an envelope of the R-F energy is obtained. Since most available klystrons do not have a grid, a thyratron modultor is provided which is capable of plate pulsing of the klystron with adequate power on the order of 1,000 volts or more. Pulse forming lines are associated with the anode and cathode circuits of the thyratron to provide an initial pulse of large amplitude and a second pulse of smaller amplitude to modulate the reflex klystron oscillator. A trigger input to the thyratron controls the repetition rate of the system. The first modulating pulse applied to the reflex klystron causes oscillation and transmission of an R-F signal from the antenna. The transmitted pulse may be blocked from the video output by a suitable gate at this time. A reflected echo signal from a target which is received by the antenna during the time that the second pulse is modulating the oscillator will cause the oscillator to generate a high amplitude signal rather than the very low signal which would normally be produced with no R-F energy present from the echo signal.

One object of the present invention is to provide a pulse radar system which is simple in construction and provides high resolution in range determination, since the essential amplification takes place in the R-F part of the system with the R-F oscillator acting as an amplifier having a wide effective bandwidth which can handle pulse information of short duration.

Another object of the present invention is to provide a pulse radar system operating in the microwave region which does not require separate transmitter and receiver sections and wherein the range resolution is not set by the practical limitations of intelligence bandwidth of I-F amplifiers in the conventional systems.

A further object of the present invention is to provide a pulse radar system which does not require automatic tuning of the receiver local oscillator to match the transmitter frequencies, since only one tank circuit is involved.

Still another object of the present invention is to provide a superregenerative pulse radar system operating in the microwave region whereby the minimum range due to ringing of the oscillator circuit is reduced by the use of higher frequencies, thus providing a shorter ringing time and shorter minimum range.

Other objects and many of the attendant advantages of this invention will be readily appreciated as the same becomes better understood by reference to the following detailed description when considered in connection with the accompanying drawings wherein:

FIG. 1 is a schematic circuit diagram illustrating one preferred form of the present invention;

FIG. 2 is a pulse diagram illustrating the form of the pulses utilized for modulating the reflex klystron of FIG. 1;

FIG. 3 is a pulse diagram illustrating the envelope of the RF energy output from the reflex klystron oscillator without the presence of an echo signal during the period of the detector pulse; and FIG. 4 is a pulse diagram illustrating the envelope of the RF energy output from the reflex oscillator with an echo return from a target at the proper distance and appearing at a time delayed just sufficiently so as to influence the detector pulse.

Referring now to the drawings in detail and more particularly to FIG. 1, a hydrogen thyratron tube 11 is provided with a suitable bias 12 through a resistor 13 and receives a trigger input through a condenser 14 at the desired repetition rate.

A high voltage such as 1,000 volts D.C. is applied to the anode of the tube 11 through a resonance changing inductor 15. A pulse forming line 16 is also associated with the plate circuit of the tube 11 between the anode 7 and the inductor 15 to reflect the step voltage occurring when the trigger input 8 initiates conduction of tube 11 and thus forming a pulse by cutting off the tube after suitable delay to form the pulse $P_1$ illustrated in FIG. 2.

The pulse $P_1$ is reflected down the delay line or a pulse forming line 17 to form the second pulse $P_2$ illustrated in FIG. 2. A cathode resistor 18 is connected between the pulse forming line 17 and ground. The pulse forming line 17 as well as the cathode 9 of the tube 11 are connected to the metal envelope or beam electrode of the reflex klystron tube 19. The cathode of tube 19 is connected to ground. The metal envelope of tube 19 is also connected through a condenser 21 to the reflector or plate circuit of the reflex klystron tube 19 with the reflector 20 being connected through a resistor 22 to a variable resistance 23 associated with a negative source of voltage, such as minus 200 volts, indicated by the numeral 24 to provide a variable reflector bias. An RF feed 25 is connected to the coupling loop 28 in resonator 29 of the reflex klystron 19 and feeds into a wave guide 26 which is adapted to be associated with a directional transmitting and receiving antenna 30.

A diode 27 is mounted in the waveguide 26 to provide a video output consisting of an envelope of the RF energy generated in the waveguide 26. If desired in certain applications the video output may be blocked during the transmission of the first burst of RF energy by a suitable gating circuit (not shown) of a conventional nature.

*Operation*

In the operation of the circuit illustrated in FIG. 1 of the drawings a trigger input 8 is applied through the condenser 14 to the hydrogen thyratron tube 11 which initiates conduction of the tube. The step voltage which appears across the inductor 15 is reflected by the delay line or pulse forming line 16 and the reflected step voltage cuts off the tube to form the pulse $P_1$ illustrated in FIG. 2.

The application of the pulse $P_1$ to the klystron 19 initiates oscillation and a burst of energy in the 10,000 mc. region having a waveform as illustrated in FIG. 3 is transmitted through the RF feed 25, waveguide 26 and the antenna 30. If there is no echo from a target during the interval when the pulse $P_2$ is applied to the klystron 19, a very small short burst of RF energy is developed as illustrated in FIG. 3.

However, if an echo signal is received from a target during the early part of the interval when the klystron 19 is modulated by the pulse $P_2$, the rate of growth of oscillations is so affected that an RF signal is generated having a waveform of much greater amplitude than that of the quiescent state, as illustrated in FIG. 4.

The waveforms of the RF energy will appear across the diode 27 to provide a video representation of the signals. If desired the transmitter output may be blocked by suitable gating and only the second or detector output will be sampled by the diode 27.

It will be apparent that all of the essential amplification takes place in the RF part of the present system and thus a wide effective bandwidth is provided which can handle pulse information of short duration thus providing high resolution in range determination.

In the system of the present invention the minimum range due to ringing or the exponential decay rate of the RF pulse is substantially decreased by the use of higher frequencies than previously used. Since the exponential decay rate is measured in cycles of time and the cycles are shorter at higher frequencies, decay will come about in a shorter time, thus permitting shorter ringing time, such that targets may be fully resolved down to ranges of the order of 10 or 15 feet without the requirement for pulse damping or other special circuits.

Obviously many modifications and variations of the present invention are possible in the light of the above teachings. It is therefore to be understood that within the scope of the appended claim the invention may be practiced otherwise than as specifically described.

What is claimed is:

A microwave superregenerative radar system for high resolution in range determination comprising a waveguide having an antenna connected therewith, a reflex klystron oscillator having a metal envelope, a reflector and cathode and a resonator in said klystron, an RF feed connecting said waveguide and said klystron for supplying energy to said waveguide, a source for plate pulsing said klystron with power, said source comprising a thyratron modulator having an anode and a cathode, a source of anode voltage for said thyratron and an input source for triggering said thyratron and controlling the repetition rate of the system, pulse forming means connected in the anode and cathode circuits of said thyratron operable to generate a pair of spaced pulses at predetermined intervals, means for connecting the thyratron cathode circuit to the metal envelope of said klystron and said metal envelope to the reflector of said klystron through a condenser, a source of variable bias voltage connected to said reflector, the initial pulse of said pair of spaced pulses being of large amplitude and the second of said pair of spaced pulses being of smaller amplitude to modulate said klystron, the first modulating pulse applied to said klystron causing oscillation and transmission of an RF signal from said antenna, and a diode in said waveguide operable to provide a video output consisting of an envelope of the RF energy in said waveguide, whereby an echo signal which is reflected from a target and received by said antenna during the time said second pulse is modulating said klystron will cause the klystron to generate a high amplitude signal rather than a very low amplitude signal that normally would be produced with no RF energy being present from the echo signal.

References Cited in the file of this patent

UNITED STATES PATENTS

| | | |
|---|---|---|
| 2,427,087 | Carlson | Sept. 9, 1947 |
| 2,433,669 | Keister | Dec. 30, 1947 |
| 2,476,409 | Free | July 19, 1949 |
| 2,498,495 | Jensen | Feb. 21, 1950 |
| 2,533,237 | Ferrill et al. | Dec. 12, 1950 |
| 2,536,801 | Emerson | Jan. 2, 1951 |
| 2,573,762 | Free | Nov. 6, 1951 |
| 2,596,996 | Hansen et al. | May 20, 1952 |